US008873969B2

(12) United States Patent
Hood et al.

(10) Patent No.: US 8,873,969 B2
(45) Date of Patent: Oct. 28, 2014

(54) METHOD FOR ONU REGISTRATION IN A PASSIVE OPTICAL NETWORK

(75) Inventors: David Hood, Palo Alto, CA (US); David Alan Ayer, Campbell, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 311 days.

(21) Appl. No.: 13/151,063

(22) Filed: Jun. 1, 2011

(65) Prior Publication Data

US 2012/0294613 A1 Nov. 22, 2012

Related U.S. Application Data

(60) Provisional application No. 61/486,655, filed on May 16, 2011.

(51) Int. Cl.
| | |
|---|---|
| H04J 14/00 | (2006.01) |
| H04B 10/00 | (2013.01) |
| H04Q 11/00 | (2006.01) |
| H04L 12/28 | (2006.01) |

(52) U.S. Cl.
CPC ... *H04Q 11/0067* (2013.01); *H04Q 2011/0079* (2013.01); *H04L 12/28* (2013.01); *H04L 12/2858* (2013.01); *H04L 12/2885* (2013.01)
USPC .............................. 398/168; 398/66; 398/153

(58) Field of Classification Search
None
See application file for complete search history.

(56) References Cited

U.S. PATENT DOCUMENTS

| 7,873,276 B2 | 1/2011 | Fan et al. | |
| 2005/0013415 A1* | 1/2005 | Atkinson et al. | 379/21 |
| 2008/0247345 A1* | 10/2008 | Bahar | 370/310 |

FOREIGN PATENT DOCUMENTS

EP 2175617 A1 4/2010

OTHER PUBLICATIONS

"Erratum 1 (Apr. 2010) to, Recommendation ITU-T G.984.3 (2008)" Covering Note, General Secretariat of the International Telecommunication Union, ITU—Telecommunication Standardization Sector, Gigabit-capable Passive Optical Networks (G-PON): Transmission convergence layer specification, Apr. 28, 2010, 1 page.
"ITU PON—Past, Present, and Future", A Review of ITU-T PON Activities, Jul. 30, 2008, FTTH Council Webinar, 43 pages, downloaded from http://www.broadband-forum.org/technical/download/TR-156.pdf, on Mar. 20, 2013.

(Continued)

*Primary Examiner* — Darren E Wolf

(74) *Attorney, Agent, or Firm* — Blakely Sokoloff Taylor & Zafman LLP

(57) ABSTRACT

Embodiments of the invention include a system for registering an optical network unit (ONU) installed in a passive optical network (PON), including a mobile terminal, a registration server, and an optical line terminal (OLT). The mobile terminal is configured to collect an ONU identification from the ONU, collect a subscriber identification, and transmit the ONU identification and the subscriber identification to a registration server via a communication system. The registration server is configured to receive the ONU identification and subscriber identification from the mobile terminal via the communication system, retrieve subscriber information from a subscriber database based on the subscriber identification, associate the ONU with the subscriber information, and transmit, to an optical line terminal, an association between the ONU and the subscriber information. The optical line terminal (OLT) is configured to serve as an endpoint for the ONU in the PON.

22 Claims, 7 Drawing Sheets

(56) References Cited

OTHER PUBLICATIONS

"Point-To-Multiport Deep Fiber Access, GPON with Ericsson EDA 1500 Fiber Solutions", Ericsson AB, 2008, 4 pages, downloaded from http://www.net-im-web.de/pdf/GPON_DFA_LZT10898062. pdf, on Mar. 20, 2013, 4 pages.

"10-Gigabit-capable passive optical networks (XG-PON): Transmission convergence (TC) specifications",Series G: Transmission Systems and Media, Digital Systems and Networks, Digital sections and digital line system—Optical line systems for local and access networks, ITU-T G.987.3, Oct. 2010, 146 pages.

"Broadband optical access systems based on Passive Optical Networks (PON)", Series G: Transmission Systems and Media, Digital Systems and Networks, Digital sections and digital line system— Optical line systems for local and access networks, ITU T Recommendation G.983.1, Jan. 2005, 124 pages.

"Gigabit-capable Passive Optical Networks (G-PON): Transmission convergence layer specification", Series G: Transmission Systems and Media, Digital Systems and Networks, Digital sections and digital line system—Optical line systems for local and access networks, Recommendation ITU-T G.984.3, Mar. 2008, 146 pages.

"Amendment 1—Specification of the ONU registration method and various clarifications", Series G: Transmission Systems and Media, Digital Systems and Networks, Digital sections and digital line system—Optical line systems for local and access networks, Gigabit-capable Passive Optical Networks (G-PON): Transmission convergence layer specification, Recommendation ITU-T G.984.3 (2008)—Amendment 1, Feb. 2009, 16 pages.

"Amendment 2: Time-of-day distribution and maintenance updates and clarifications", Series G: Transmission Systems and Media, Digital Systems and Networks, Digital sections and digital line system— Optical line systems for local and access networks, Gigabit-capable Passive Optical Networks (G-PON): Transmission convergence layer specification, Recommendation ITU-T G.984.3 (2008)—Amendment 2, Nov. 2009, 18 pages.

"Using GPON Access in the context of TR-101", TR-156, The Broadband Forum, Technical Report, Issue: 1, Dec. 2008, 50 pages, downloaded from www.broadband-forum.org/technical/download/ TR-156.pdf, on Mar. 20, 2013.

"Part 3: Carrier Sense Multiple Access with Collision Detection (CSMA/CD) Access Method and Physical Layer Specifications", Amendment: Media Access Control Parameters, Physical Layers, and Management Parameters for Subscriber Access Networks, IEEE Std 802.3ah-2004, Sep. 7, 2004, 640 pages.

"Part 3: Carrier Sense Multiple Access with Collision Detection (CSMA/CD) Access Method and Physical Layer Specifications", Amendment 1: Physical Layer Specifications and Management Parameters for 10 Gb/s Passive Optical Networks, IEEE Std 802.3av-2009, Oct. 30 2009, 236 pages.

\* cited by examiner

METHOD FOR ONU REGISTRATION IN A PASSIVE OPTICAL NETWORK

CROSS-REFERENCE TO RELATED APPLICATIONS

This application claims the benefit of U.S. Provisional Application No. 61/486,655, filed on May 16, 2011, which is hereby incorporated by reference.

FIELD

Embodiments of the invention relate generally to the field of passive optical networks and more particularly to registration of optical network units.

BACKGROUND

A passive optical network (PON) comprises a central terminal, the optical line termination (OLT), which serves a plurality of optical network units (ONUs) at or near subscriber locations. PONs are described more fully in ITU-T G.984.3, titled "Gigabit-capable Passive Optical Networks (G-PON): Transmission Convergence Layer Specification" (March 2008) and ITU-T G.987.3, titled "10-Gigabit-Capable Passive Optical Networks (XG-PON): Transmission Convergence (TC) Specifications" (October 2010), in IEEE 802.3ah (2004), "Media Access Control Parameters, Physical Layers, and Management Parameters for Subscriber Access Networks," and in IEEE 802.3av (2009), "Physical Layer Specifications and Management Parameters for 10 Gb/s Passive Optical Networks." In a power-splitting PON, the OLT launches a modulated signal into an optical fiber. The signal is divided by a tree of optical splitting devices, or in some cases electrical repeaters, such that each ONU receives a copy of the complete signal, from which it decodes a subset of the signal that is of interest to itself.

In the upstream direction, each ONU transmits its traffic in a series of distinct bursts, each of which is orchestrated by the OLT in such a way that bursts from separate ONUs do not overlap in time; time-interleaved resource sharing is often referred to as time division multiple access (TDMA). The signals from the plurality of ONUs are merged by the tree of passive optical splitters to reach the OLT by way of a single fiber.

In traditional copper pair communications, there is a direct relationship between a physical pair of wires at the central office and a given subscriber terminal However a PON is a multiple-access medium, and there is no physical way to uniquely associate a given subscriber with a given terminal, for example on the OLT.

To deliver the correct service to a given subscriber, it is necessary to assign a physical ONU device to the subscriber, and to associate some identification of that physical ONU device with the protocol layers of the service. Frequently, an ONU identification is the factory serial number burned into the ONU when it is manufactured, but it can be any information whose uniqueness can be assured within the scope of the operator's domain, e.g., a media access control (MAC) address. The ONU identification information may be permanent, as in the case of a serial number or MAC address, or alterable, as in some of the cases described further below.

The process of associating an ONU with a subscriber begins when the subscriber contacts the telecommunications operator's service order entry (SOE) function to place an order for telecommunications service. The SOE function collects subscriber information such as name, street address, desired set of telecommunications services (for example: Internet service tier or IPTV channel line-up), and any pre-existing information that may need to be carried over, for example, a pre-existing telephone number, or possibly even a complete service definition. The latter could be appropriate in the case that the subscriber is moving from one home to another.

The SOE function supplies service definition information to a provisioning operations system (POS) function, which is responsible for translating the subscriber's street address into a specific central office, a specific multi-PON OLT terminating equipment (in the case of interest for this invention), and a specific PON. The POS also interprets information such as IPTV, internet or telephone service parameters into the necessary detailed bit and byte-level provisioning information necessary to configure the OLT, the ONU, and possibly other elements that are not pertinent to this invention (for example authentication parameters in an authentication server).

Possibly through the mediation of an element management system (EMS) function, the POS communicates the OLT and ONU parameters to the proper OLT. Because no ONU has yet been installed, the OLT retains these parameters, pending the appearance and registration of the proper ONU. The OLT is then said to have a pre-provisioned service for the given subscriber. The EMS assigns a subscriber management identifier (SMI) to the subscriber's ONU. This is normally a sequence of fields in the nature of <OLT identifier>-<slot number>-<port number>-<ONU number>, where the first three fields are fixed by the network and equipment topology that serves the subscriber's particular location, and the ONU number is free to be chosen at will, as long as it does not conflict with another SMI. Customarily, the ONU number is selected as an integer in the range from 1 to the maximum number of ONUs supported on the particular PON, for example 64. The SMI uniquely identifies the subscriber, and all of the subscriber's provisioned services, in a way that can be sent to the correct OLT, where it comprises most of the information necessary to deliver service to the subscriber from the previously provisioned service parameters, namely a slot and port number. In the context of this invention, the SMI is not necessarily the same as the later described subscriber identification used to identify a specific subscriber out of all of the telecommunication operator's customers, although it will be apparent to one of ordinary skill in the art that the SMI may be used in some embodiments as the subscriber identification.

When the OLT discovers a new ONU, the OLT assigns a PON address to the ONU, that is, a value through which the ONU is identified in PON transactions across the optical distribution network. The OLT assigns a PON address to a specific ONU, which it identifies by the ONU's serial number. The discovery protocol of all PON systems includes a method in which the ONU reports its serial number to the OLT. In the present description, the term ONU identification is used to include any single information element or combination of information elements that are permanently associated with a particular ONU during manufacture and that are, individually or in combination, unique to that ONU. In this sense, a MAC address, for example, is logically the equivalent of an ONU identification; or in another case the ONU identification may include, or consist solely of, the ONU's serial number.

However, no service can be delivered until a correlation or a mapping is established between the subscriber's identity, subscriber identification (e.g., SMI), and the specific ONU that is installed at the subscriber's premises. This is logically equivalent to the necessity for the SMI to be correlated to the ONU's PON address. The process of associating a service and billing entity (the subscriber) with a physical ONU, and associating the physical ONU with protocol layer identifiers, is called registration.

The SOE system also coordinates the service order with a work force administration (WFA) function, to assign a work order or installation order to a particular installer, possibly at a particular date and time. The work order contains information about the street address, the required ONU type, and service information such as a telephone number or IPTV subscription profiles, such that the installer is capable of verifying service at the time of installation. It is to be noted that, in this use case, no specific ONU identifier is included in the work order. The installer is free to use any available ONU of the proper type.

It will be appreciated that most of the information items noted above, as well as a work order number, can be used to uniquely identify the subscriber, the intended geographic location of the ONU, and the specified services. Accordingly, the term subscriber identification is to be understood to encompass any of these or other information items that are uniquely associated with the collection enumerated above. Knowing the subscriber identification is also equivalent to knowing the SMI in the OLT system.

It is desirable to pre-provision service into the telecommunications network, and particularly into the OLT, such that, when the ONU is physically installed at the subscriber premises, service comes up immediately, and the installer can verify the integrity of all services while still on-site, and therefore without the need for the delay and expense of an additional site visit.

In one registration solution, a service provider selects a particular ONU from inventory, assigns that ONU's identification to a subscriber installation order (i.e., subscriber work order), and assures the correct ONU is installed at the subscriber location. This registration solution is referred to herein as the pre-registration solution and is, at least partially, described in ITU-T G.984.3 Amendment 1, titled "Gigabit-capable Passive Optical Networks (G PON): Transmission convergence layer specification; Amendment 1—Specification of the ONU registration method and various clarifications" (February, 2009). This solution is further described in Broadband Forum Technical Report TR-156, titled "Using GPON Access in the Context of TR-101" (issued December, 2008). Since the ONU identification and subscriber identification are known a priori, it is straightforward for the service provider to associate the ONU identification with the subscriber identification and provision telecommunication service to the ONU via the SMI into the OLT serving that ONU. With this method, the OLT and ONU are able to initialize service as soon as the ONU is installed in the PON for on the spot service validation.

However, the pre-registration solution presents significant logistical problems. Specific ONUs must be identified in inventory, located in a warehouse, and moved from the warehouse to a staging area to a truck to a subscriber's premises by multiple personnel over the course of at least a few days. There are many opportunities for errors in this sequence, and, absent errors, there is always the possibility that the designated ONU turns out to be damaged or defective and, therefore, cannot be used.

The pre-registration solution may be suitable for some ONU installations, for example, PON-fed remote multiplexes or multiple-dwelling units (MDUs). Such installations are characterized by having been planned under engineering work orders, rather than subscriber installation or repair work orders. The lower volume of these installations may make it feasible to stage specific ONU equipment. However, the pre-registration solution is not ideal for high-volume residential ONU installation.

Another registration solution, referred to herein as the pre-provision solution, does not presuppose that ONU identification is known in advance of ONU installation. Service is pre-provisioned for the subscriber using the subscriber identification at the OLT but without a corresponding ONU identification. At installation time, an installer selects any ONU of the proper type from those ONUs available, for example on the truck. To associate the ONU with the subscriber, the installer communicates with an operator at the service provider operations center (e.g., network operations center). The installer communicates with the operator through voice or textual communication, for example by way of a cell phone, and supplies the operator with subscriber or work order identification and ONU identification. The operator enters the information into the service provider's back-office service management information technology (IT) system to create an association between the ONU and the subscriber (i.e., register the ONU). The ONU identification is thus correlated with the subscriber identification and the pre-provisioned service parameters. By transmitting the ONU identification to the OLT in conjunction with the pre-provisioned service identifier, the IT system enables the OLT to then bring up service, which can be validated by the installer at the subscriber premises.

The pre-provision solution requires human interaction at both the subscriber premises and the network operations center. Coordination between the installer and the operator may be hampered by the availability of the operator, schedule conflicts, or by any number of reasons that inhibit the operator's ability to communicate with the installer or respond to the registration request. Furthermore, verbal or text-message communication of the subscriber identification and ONU identification is error prone and time consuming. For these reasons, the pre-provision solution is not used in practice.

FIG. 1 is a block diagram illustrating the components of a pre-provision solution according to the prior art. The telecommunications network 100 includes OLT 120 coupled to a plurality of ONUs, of which an ONU 110 newly installed at, or near, a subscriber premises is shown. The ONU 110 is coupled to the OLT 120 via a PON link 121. The OLT 120 is further coupled to a service provider's IT system 170 through one or more network links 171.

During installation, an installer 140 couples the ONU 110 to the PON, performs any pre-service tasks (e.g., mounting the ONU, connecting computers or service devices to the ONU and providing power to the ONU) and then contacts an operator at the network operations center (NOC) 160 via a cell phone 150 through a communication link 151. When the ONU 110 powers up and initializes, it announces itself to the OLT 120 via the PON. Although the ONU 110 supplies its serial number to the OLT 120 as an intrinsic part of the ONU discovery process, the OLT 120 has no way to associate the ONU 110 with a subscriber or with service parameters.

Thus, the installer 140 collects the corresponding subscriber identification and ONU identification. For example, a paper record of a work order may contain the subscriber identification. The subscriber identification may indeed be implicit in the work order number, as is the intended geographic location of the installation. The installer 140 can read the serial number from the housing of the ONU 110. The installer 140 relays this information to the NOC operator via the cell phone 150. The NOC operator creates an association between the subscriber identification and the ONU identification in the IT system 170. The IT system 170 communicates the association to the OLT 120, which provisions telecommunication service to the ONU 110 using the pre-provisioned service parameters.

A third registration solution exists, referred to herein as the registration ID solution. In this solution, the OLT initially associates a new ONU, not by its ONU identification but rather by a registration ID (sometimes also referred to as a password). The registration ID solution is, at least partially, described in ITU-T G.984.3 Amendment 1 and further described in a Telcordia Presentation, titled "ITU PON—Past, Present, and Future" (prepared Jul. 30, 2008). The registration ID solution is further described in Broadband Forum Technical Report TR-156. Upon creation of the installation order or repair order, a registration ID is generated and associated with the work order. Depending on the service provider policies, the registration ID may be very simple (e.g., the ONU number on the PON) or very elaborate (e.g., a cryptographically unique string similar to a license key for commercial software). Telecommunication service is then provisioned with the OLT in association with the registration ID. The registration ID is communicated either to the installer (e.g., via a field on a work order) or to the subscriber (e.g., by postal mail). Upon installing the ONU, a registration ID prompt is presented (e.g., by a simple web page served by the ONU) and the registration ID is entered into the ONU or into a computer connected to the ONU. It will be appreciated that serving a web page by the ONU increases the cost and complexity of the ONU to a degree and exposes the underlying software to potential tampering.

When the ONU initializes onto the PON with the OLT, the OLT associates the ONU to the proper SMI by its registration ID only. During this initialization, the OLT also learns the ONU's identification. Once the OLT learns the ONU identification, the OLT may be instructed to switch from registration ID recognition to ONU identification recognition, such that the registration ID is no longer used. This process is commonly known as locking the ONU.

Although the registration ID solution is widely used, it has its own disadvantages. One of these is apparent in the fact that a locking policy may be required: if the subscriber has actual or potential access to the registration ID, it can be changed, affecting either service or security, or both. It is also inconvenient and error-prone to enter an especially long registration ID, and there is no standard feedback mechanism by which the OLT can convey an error message and an invitation to try again.

The pre-provision solution would be the preferred method of registration if it were possible to avoid the coordination and communication problems inherent between humans. Therefore, the present disclosure describes methods, systems, and apparatus to overcome the disadvantages described with reference to the pre-provision solution.

It will be appreciated that, if an existing ONU fails and must be replaced, the identity of the new ONU must be discovered in one of the same ways that have been described above for new ONU installation.

SUMMARY

Embodiments of the invention include a system for registering an optical network unit (ONU) installed in a passive optical network (PON), including a mobile terminal, a registration server, and an optical line terminal (OLT). The mobile terminal is configured to collect an ONU identification from the ONU, collect a subscriber identification, and transmit the ONU identification and the subscriber identification to a registration server via a communication system. The registration server is configured to receive the ONU identification and subscriber identification from the mobile terminal via the communication system, retrieve subscriber information from a subscriber database based on the subscriber identification, associate the ONU with the subscriber information, and transmit, to an optical line terminal, an association between the physical ONU and the subscriber information as identified in the OLT by SMI. The optical line terminal (OLT) is configured to serve as an endpoint for the ONU in the PON.

Embodiments of the invention include a method performed by a registration server for registering an optical network unit (ONU) in a passive optical network (PON). The registration server receives an ONU identification, that was previously collected at a mobile terminal, via a communication network. The registration server receives a subscriber identification, that was previously collected at the mobile terminal. The registration server retrieves subscriber information based on the subscriber identification from a subscriber database. The registration server associates the ONU with the subscriber information and transmits an association between the ONU and the subscriber information to an optical line terminal (OLT) serving as an endpoint for the ONU in the PON. Embodiments of the invention include a method performed by a mobile terminal for registering an optical network unit (ONU) in a passive optical network (PON). The mobile terminal collects an ONU identification and a subscriber identification. The mobile terminal transmits the ONU identification and subscriber identification to a registration server to associate the ONU with a subscriber corresponding to the subscriber identification.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DETAILED DESCRIPTION

Figure 1:
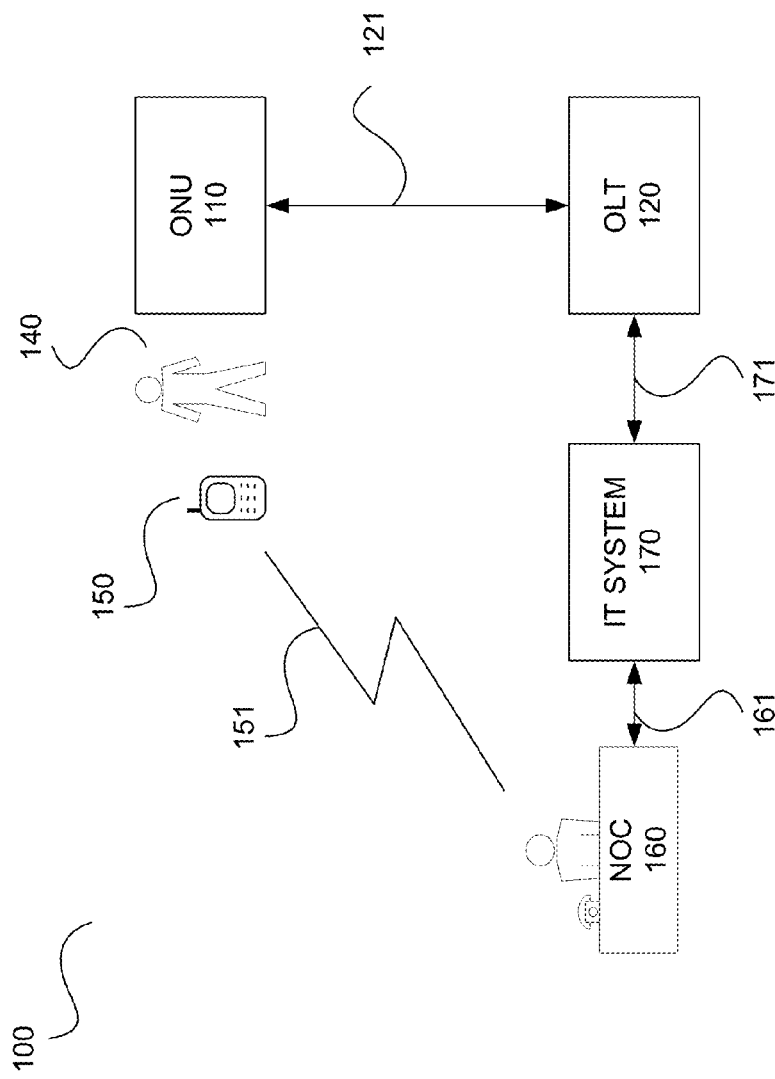
FIG. 1 is block diagram illustrating the components of a pre-provision solution according to the prior art.

The following description describes methods and apparatus for registration of an ONU in a PON. In the following description, numerous specific details such as logic implementations, opcodes, means to specify operands, resource partitioning/sharing/duplication implementations, functional servers, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

In order to diminish problems with the pre-provision solution, embodiments of the invention modify the pre-provision solution to avoid the need for coordination between an installer at the subscriber premises and an operator at the service provided. As such, a mobile terminal is introduced to aid in the registration of an ONU which reduces coordination issues and communication accuracy issues during registration of an ONU. In one embodiment, the mobile terminal is a handheld wireless terminal with a user interface, a display screen, and a radio communication module. This embodiment of the mobile terminal is similar to devices used in the car rental environment and may include an electronic reader, such as a bar code reader, to collect information. Another embodiment of the mobile terminal utilizes a cell phone with a specialized application, possibly further utilizing a barcode reader component, for inputting the necessary information and transmitting to the service provider's computer. Yet another embodiment may utilize other embodiments of a mobile terminal such as a laptop application designed to collect the required ONU identification and subscriber identification and communicate with the service provider's computers. Still further embodiments of the mobile terminal may utilize a radio frequency identification (RFID) reader to collect information during registration from RFID transmitters. Still further embodiments of the mobile terminal may utilize Global Positioning Systems (GPS) receivers to determine the geographic location of the mobile terminal during installation. One of skill in the art would recognize that suitable variations of the mobile terminal may be utilized depending upon the specific requirements and configurations service providers design for their ONU registration systems.

A specific ONU may be identified in a number of ways. An ONU can be identified by a manufacturer identity and a manufacturer serial number, which are visible on a sticker attached to the ONU housing. This information can be made available as machine-readable information to an OLT, during the ONU discovery process. The ONU's identification may additionally include information that permits its type to be determined, for example whether it includes POTS telephone ports, and if so, how many. This information may be encoded in the serial number, or may be available as secondary information fragments, further fields on the sticker and/or machine-readable to the OLT. Furthermore, an ONU may be delivered from the factory in a package of some kind, for example a cardboard box or a shrink-wrap module. The ONU type, vendor and serial number could be on the package, as well as on the ONU itself, and an RFID chip might well be present only in the packaging. It will be appreciated that other forms of unique ONU identification are also possible.

At the time of installation, the installer travels to the designated street address. In one embodiment of the invention, the geographic location, for example from a GPS receiver, may be used to retrieve the work order. If there is a choice of ONU type, the installer determines the necessary ONU type from the work order, performs the physical installation process, and connects it to the PON. When the ONU powers up, its normal state progression, as defined by G.984.3, G.987.3, IEEE 802.3 and other PON standards, is to attempt to be discovered by the OLT. In the discovery process, the OLT learns the ONU identification (e.g., its vendor identity and vendor serial number). However, the OLT does not know the association between the ONU identification and the appropriate collection of pre-provisioned telecommunications services, which are linked to the SMI.

Figure 2A:
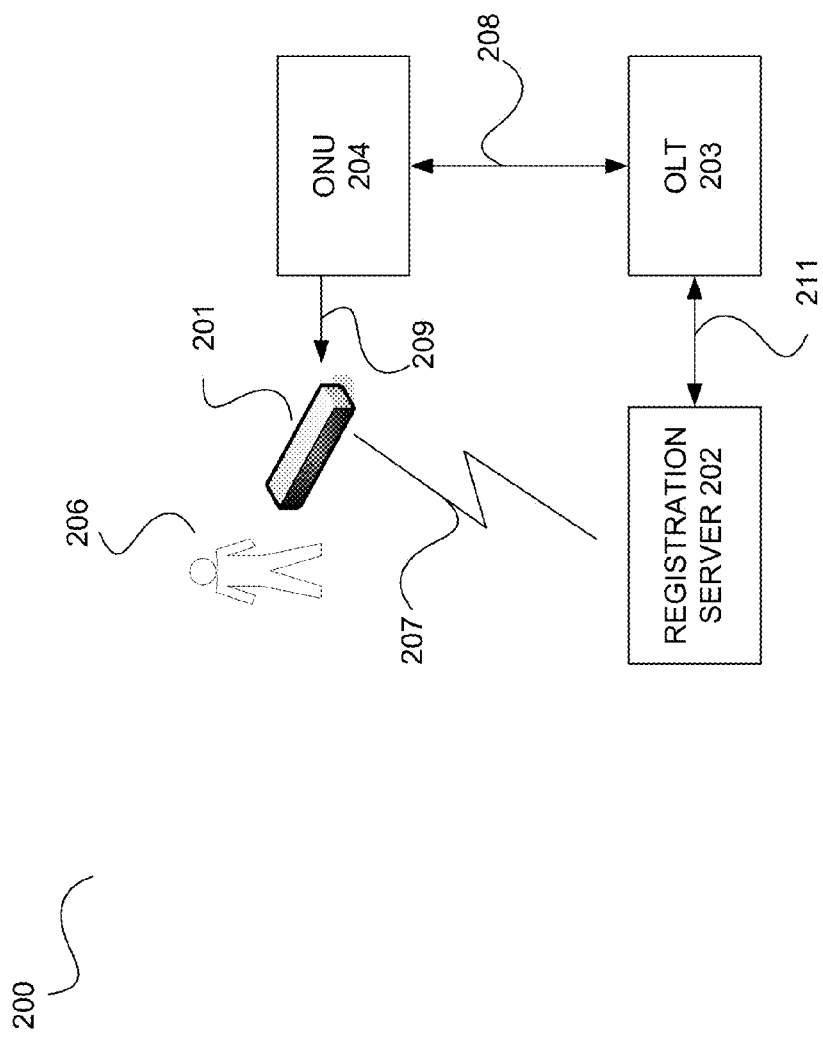
FIG. 2A is block diagram illustrating the components of an ONU registration system according to embodiments of the invention.

FIG. 2A is a block diagram illustrating the components of an ONU registration system according to embodiments of the invention. The telecommunications network 200 includes OLT 203 coupled to a plurality of ONUs, of which an ONU 204 newly installed at, or near, a subscriber premises is shown. The ONU 204 is coupled to the OLT 203 via a PON link 208. The OLT 203 is further coupled to a registration server 202 through one or more network links 211.

During installation, an installer 206 couples the ONU 204 to the PON, performs any pre-service tasks (e.g., mounting the ONU, connecting computers or service devices to the ONU and providing power to the ONU) and then utilizes a mobile terminal 201 to perform ONU registration. The mobile terminal 201 collects subscriber identification, ONU identification 209, and, optionally, actual geographic location of the ONU. The mobile terminal 201 communicates the requisite messages to the registration server 202 to complete the registration of the ONU 204 through a communication link 207.

Figure 2B:
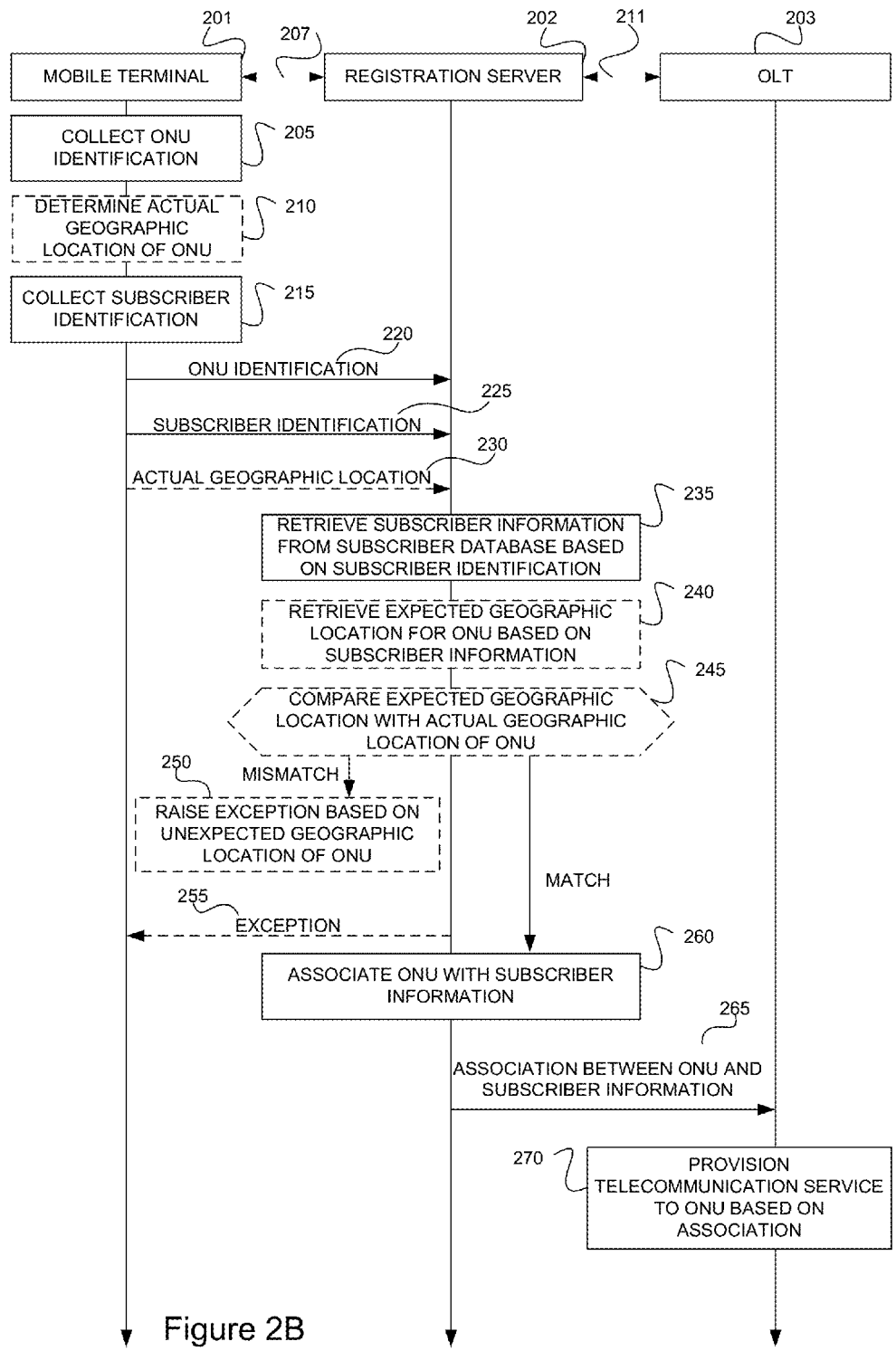
FIG. 2B illustrates a data flow diagram showing steps performed at a mobile terminal, a registration server, and an OLT and information communicated during the registration of an ONU according to embodiments of the invention.

FIG. 2B illustrates a data flow diagram showing steps performed at a mobile terminal, a registration server, and an OLT and information communicated during the registration of an ONU according to embodiments of the invention. Along the top of FIG. 2B, a mobile terminal 201, a registration server 202, and an OLT 203 are each illustrated with a vertical line indicating the progression of time. The communication of various information and messages is illustrated chronologically down as horizontal arrows between the vertical lines and steps performed are shown as boxes on the vertical lines.

In FIG. 2B, the mobile terminal 201 is coupled with the registration server 202 through a communications link 207. In one embodiment of the invention, the communication system is a cellular data network coupling the mobile terminal 201 to the registration server 202 such as a second generation, third generation, or fourth generation data network (e.g., EDGE network, EDGE Evolution network, CDMA2010 network, 3GPP Long Term Evolution (LTE) network, LTE Advanced network, WiMAX network, GSM, PCS). In another embodiment, the communication system includes a coupling of wireless networks (e.g., 802.11 A/B/G/N) with the service provider's registration server 202 through a network infrastructure such as the Internet. In yet another embodiment of the invention, the mobile terminal may be coupled with the registration server through a wired connection such as a dial-up modem over a plain old telephone service (POTS) connection to the registration server 202. One of ordinary skill in the art would recognize that there any many options for coupling a mobile terminal to a server at the service provider's premises that would serve as the communication system in various embodiments of the invention.

In FIG. 2B, the registration server 202 may comprise a number of physically or logically separate servers operated by the service provider. For example, a work order may be retained and closed on a work-force administration server while the association between an ONU and a subscriber may flow through a service provisioning server. Thus, in one embodiment, the registration server comprises a number of functional units that interact to maintain work orders, ONU-subscriber association, and telecommunication service provisioning. In another embodiment, the registration server is a stand-alone server that is coupled with other services in the service provider's network and communicates messages to the various servers to accomplish the ONU registration.

At some point during installation, usually after the physical installation of the ONU at the subscriber premises, the installer initiates registration of the ONU. The mobile terminal 201 collects ONU identification at step 205. In one embodiment of the invention, the mobile terminal determines the actual geographic location where the ONU is installed at optional step 210. The mobile terminal also collects the subscriber identification at step 215. The mobile terminal 201 communicates the ONU identification (message 220), the subscriber identification (message 225), and, optionally, the actual geographic location (message 230) to the registration server 202. The registration server uses the subscriber identification from 225 to retrieve subscriber information from a subscriber database at step 235.

In embodiments that utilize the actual geographic location from 230, the registration server further retrieves the expected geographic location for the ONU based on the subscriber information at optional step 240. The expected geographic location for the ONU may correspond to a service address previously provided by a subscriber to the service provider or may correspond to a designated location for the ONU installation generated by the service provider. In either case, the registration server 202 optionally continues to step 245 and compares the expected geographic location with the actual geographic location from 230. Using this information, the registration server can determine if the actual geographic location and the expected geographic location are in sufficiently close proximity to be considered a match. The proximity requirements vary from service provider to service provider. In the case that there is a mismatch between actual geographic location and the expected geographic location, the registration server 202 raises an exception based on the unexpected geographic location of the ONU at step 250. This exception may be communicated to the mobile terminal 201 to be presented to the installer so that the installer can react properly to the unexpected geographic location exception. For example, the installer may determine that no action is required and may enter override instructions to continue installation, or the installer may recognize that the wrong ONU or wrong work order was being utilized at the installation location and correct the installation by switching to the correct ONU or work order.

It will be appreciated that expected geographic location is just one exception that may be recognized by the registration server 202. For example, the registration server 202 may further verify the manufacturer and model of the ONU being installed and raise a corresponding exception in the same or similar manner.

In the case that the registration server 202 determines there is a match between the actual geographic location and the expected geographic location, or the case where the actual geographic location is not utilized, the registration server 202 continues at step 260 by associating the ONU identification with the subscriber information. The registration server 202 continues at step 265 by communicating the association between the ONU identification and the subscriber information to the OLT 203 through one or more network links 211. The OLT 203 uses the association from 265 to provision telecommunications service to the ONU at step 270. In one embodiment, the OLT 203 is previously configured with the service parameters for the subscriber corresponding to the subscriber identification, but the ONU identification is not previously known to the OLT 203. In this case, the ONU identification is associated with the pre-provisioned service parameters and the ONU with the given identification receives the service parameters after both the ONU initializes with OLT 203 and the OLT 203 receives the association between the ONU and the subscriber information. In another embodiment, the OLT 203 provisions telecommunications service for the ONU upon receiving the association between the ONU and the subscriber information where the subscriber information includes information identifying the service parameters for that subscriber.

One of ordinary skill in the art would appreciate the numerous advantages to the ONU registration described with reference to FIG. 2A and FIG. 2B. The ONU registration described in FIG. 2A and FIG. 2B is intrinsically more secure than the registration ID solution described in the background. Furthermore, an ONU that does not need to support the registration ID solution is less expensive and does not expose its underlying software to the subscriber. Furthermore, the integration of the mobile terminal with existing business practices, such as work-force administration and work order location verification, allows the service provider to supply a higher rate of successful installations.

Figure 3:
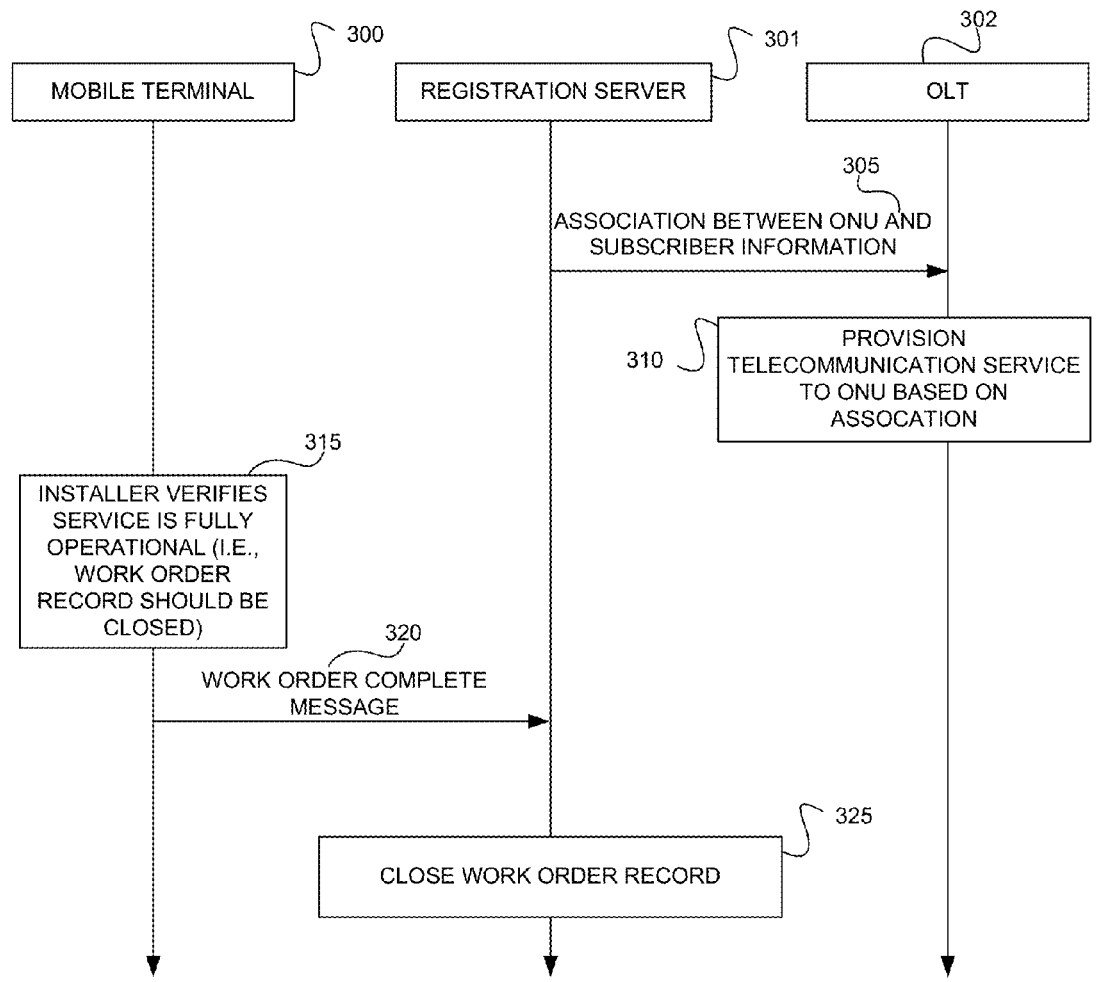
FIG. 3 illustrates a data flow diagram showing steps performed at a mobile terminal, a registration server, and an OLT and information communicated during a work order installation, including registration, of an ONU according to embodiments of the invention.

FIG. 3 illustrates a data flow diagram showing steps performed at a mobile terminal, a registration server, and an OLT and information communicated during a work order installation, including registration, of an ONU according to embodiments of the invention. Along the top of FIG. 3, a mobile terminal 300, a registration server 301, and an OLT 302 are each illustrated with a vertical line indicating the progression of time. The communication of various information and messages is illustrated chronologically down as horizontal arrows between the vertical lines and steps performed are shown as boxes on the vertical lines.

FIG. 3 begins with the registration server 301 communicating an association between an ONU and subscriber information to the OLT 302 with a message 305 as previously described with reference to FIG. 2A and FIG. 2B. As in FIG. 2A and FIG. 2B, OLT 302 provisions telecommunications service to the ONU based on the association communicated in message 305. After the OLT 302 provisions telecommunications service to the ONU, the installer verifies that service is fully operational. In one embodiment, the installer couples the mobile terminal 300 to the ONU to verify that service is operational. In another embodiment, the installer may utilize a computer or other customer premises devices such as telephone sets coupled to the ONU to verify that service is operational. Once it is determined that service is fully operational, the installer chooses to close out the work order. In response to the installer closing the work order, the mobile terminal sends a work order complete message 320 to the registration server 301. In response to receiving the work order complete message 320, the registration server 301 closes a work order record corresponding with the work order at step 325. In embodiments where the registration server 301 comprises, logically or physically, a work-force administration server, the registration server 301 is able to close out the work order record directly. In other embodiments, the registration server 301 communicates a message to the appropriate server within the service provider's network to initiate the closing of the work order record at that server.

Figure 4:
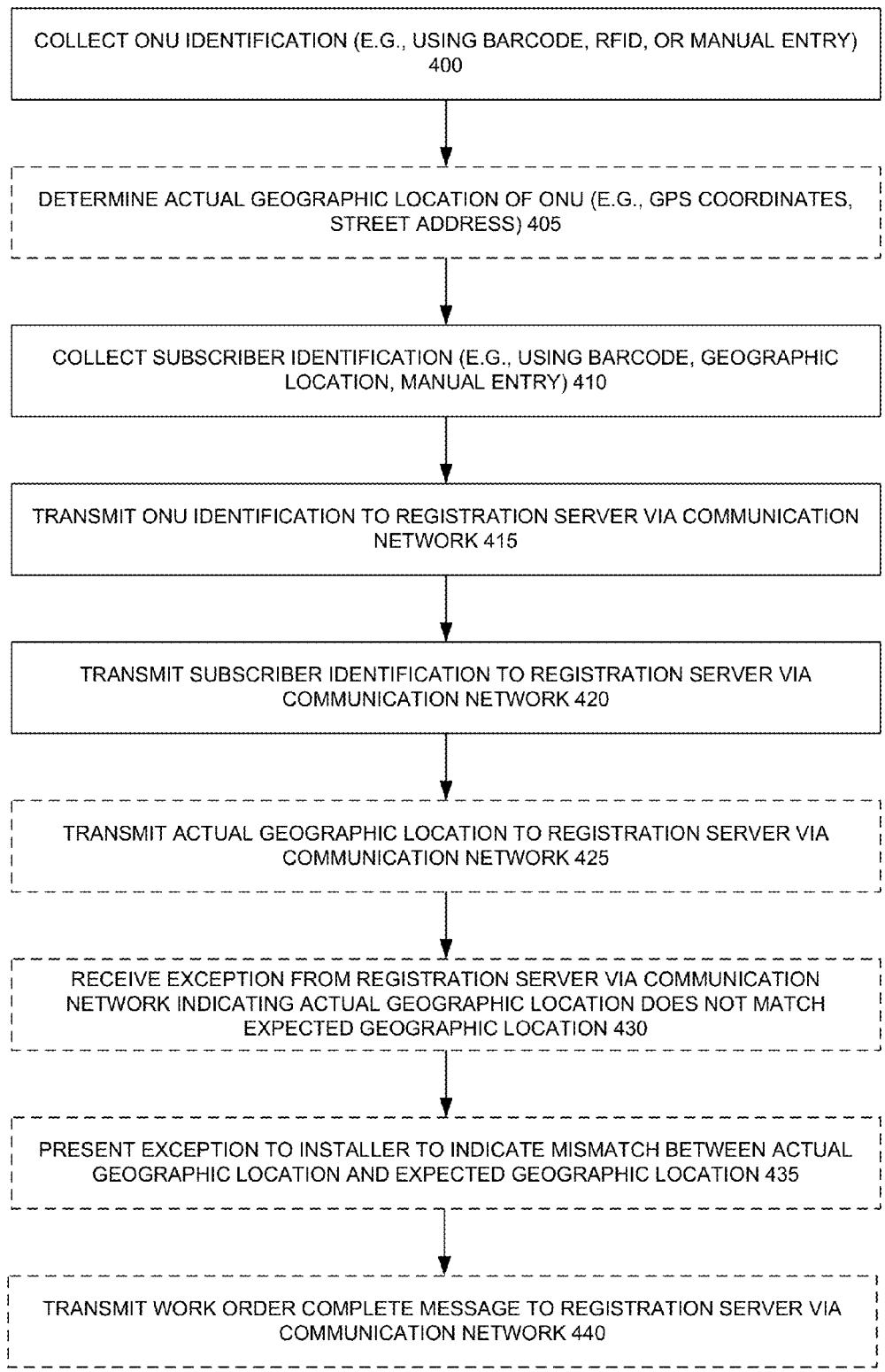
FIG. 4 illustrates a flow chart of a method for registering an ONU with a mobile terminal in accordance with embodiments of the invention.

FIG. 4 illustrates a flow chart of a method for registering an ONU with a mobile terminal in accordance with embodiments of the invention. FIG. 4 begins at step 400 with the mobile terminal collecting the ONU identification. The mobile terminal may utilize any appropriate input method to collect the ONU identification. One embodiment of the invention provides a user input mechanism to the installer to allow the installer to manually enter the ONU identification. For example, the mobile terminal may comprise a keypad, a keyboard, or a touch screen input mechanism along with a prompt to the installer to input the ONU identification. In another embodiment, the mobile terminal includes an electronic reader designed to collect the ONU identification. In one embodiment of the electronic reader, the ONU includes a barcode that represents the ONU identification and the mobile terminal uses a bar code reader or digital camera to collect the ONU identification. In another embodiment of the electronic reader, the ONU includes an RFID chip that contains information representing the ONU identification and the mobile terminal includes an RFID reader that collects the ONU identification from the ONU.

In embodiments that utilize the actual geographic locations of the ONU, the mobile terminal determines the actual geographic location of the ONU at optional step 405. In one embodiment of the invention, the mobile terminal utilizes a global positioning system (GPS) to determine the actual geographic location of the ONU based on the location of the mobile terminal In another embodiment of the invention, the mobile terminal utilizes a street address to determine the actual geographic location of the ONU. In yet another embodiment of the invention, the mobile terminal includes a user input mechanism appropriate to prompt the installer and accept input representing the actual geographic location of the ONU (e.g., accepting an address, geographic coordinates).

The mobile terminal continues at step 410 with collecting subscriber identification. As with collecting the ONU identification, the mobile terminal may prompt the installer to input the subscriber identification through manual entry, or may determine the subscriber information through other mechanisms. In one embodiment of the invention, the mobile terminal utilizes an electronic reader to read the subscriber information from a paper work order record using, for example, a barcode on the paper work order. In another embodiment, the mobile terminal uses the actual geographic location to determine a corresponding subscriber and the subscriber identification.

The mobile terminal continues at step 415 by transmitting the ONU identification to a registration server via a communication network as described with reference to FIG. 2A and FIG. 2B. The mobile terminal then continues at step 420 by transmitting the subscriber identification to the registration server, and in embodiments utilizing the actual geographic location of the ONU, the mobile terminal also transmits the actual geographic location to the registration server at optional step 425.

Depending on the configuration of the registration server, the actual geographic location of the ONU, and the expected geographic location of the ONU, the mobile terminal may receive an exception from the registration server indicating that the actual geographic location of the ONU does not match the expected geographic location at step 430. In response to receiving the exception, the mobile terminal presents the exception to the installer to indicate the mismatch between the actual geographic location of the ONU and the expected geographic location at step 435. In one embodiment, the mobile terminal utilizes an audio presentation of the exception while in another embodiment the mobile terminal utilizes a visual presentation of the exception. Still other embodiments may utilize any combination of audio and visual presentation of the exception to the installer.

As described with reference to FIG. 3, once the installer verifies that service is fully operational at the ONU, the installer can, optionally, utilize the mobile terminal to close out the work order. In response, the mobile terminal transmits a work order complete message to the registration server via the communication network at optional step 440.

Figure 5:
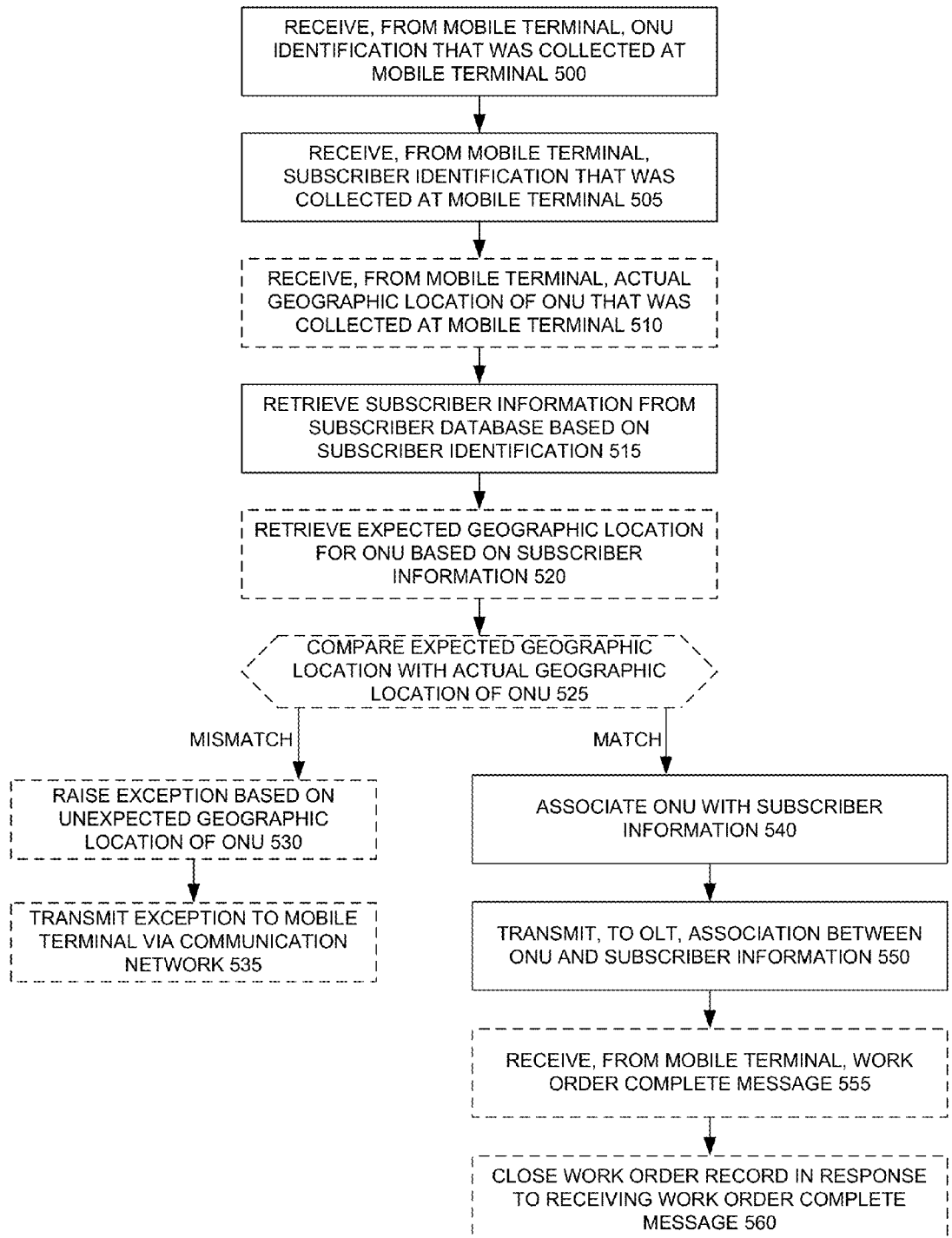
FIG. 5 illustrates a flow chart of a method for registering an ONU with a registration server in accordance with embodiments of the invention.

FIG. 5 illustrates a flow chart of a method for registering an ONU with a registration server in accordance with embodiments of the invention. The figure begins at step 500 with the registration server receiving, from a mobile terminal via a communication network, ONU identification that was collected at the mobile terminal. The method continues at step 505 with the registration server receiving, from the mobile terminal via the communication network, subscriber identification that was collect from the mobile terminal. For embodiments utilizing geographic location, the registration server continues optionally at step 510 with receiving the actual geographic location of the ONU that was collected from the mobile terminal. The registration server retrieves subscriber information from a subscriber database based on the subscriber identification at step 515.

Optionally, the registration server further retrieves the expected geographic location for the ONU based on the subscriber information at step 520. In those embodiments utilizing geographic location, the registration server compares the expected geographic location of the ONU with the actual geographic location of the ONU at step 525. In response to a mismatch, the registration server raises an exception based on the unexpected geographic location of the ONU at step 530 and optionally transmits the exception to the mobile terminal via the communication network at step 535.

In the case of match between the expected and actual geographic location, or the instance where geographic location is not used, the registration continues at step 540 with associating the ONU with the subscriber information. The registration server transmits the association between the ONU and the subscriber information to an OLT with the expectation that the OLT will provision the appropriate telecommunications service to the ONU in response at step 550.

In embodiments utilizing work order complete messages, the registration server will receive a work order complete message from the mobile terminal at step 555 indicating the completion of the work order by the installer at step 555. At step 560, the registration server closes the work order in response to receiving the work order complete message.

Figure 6:
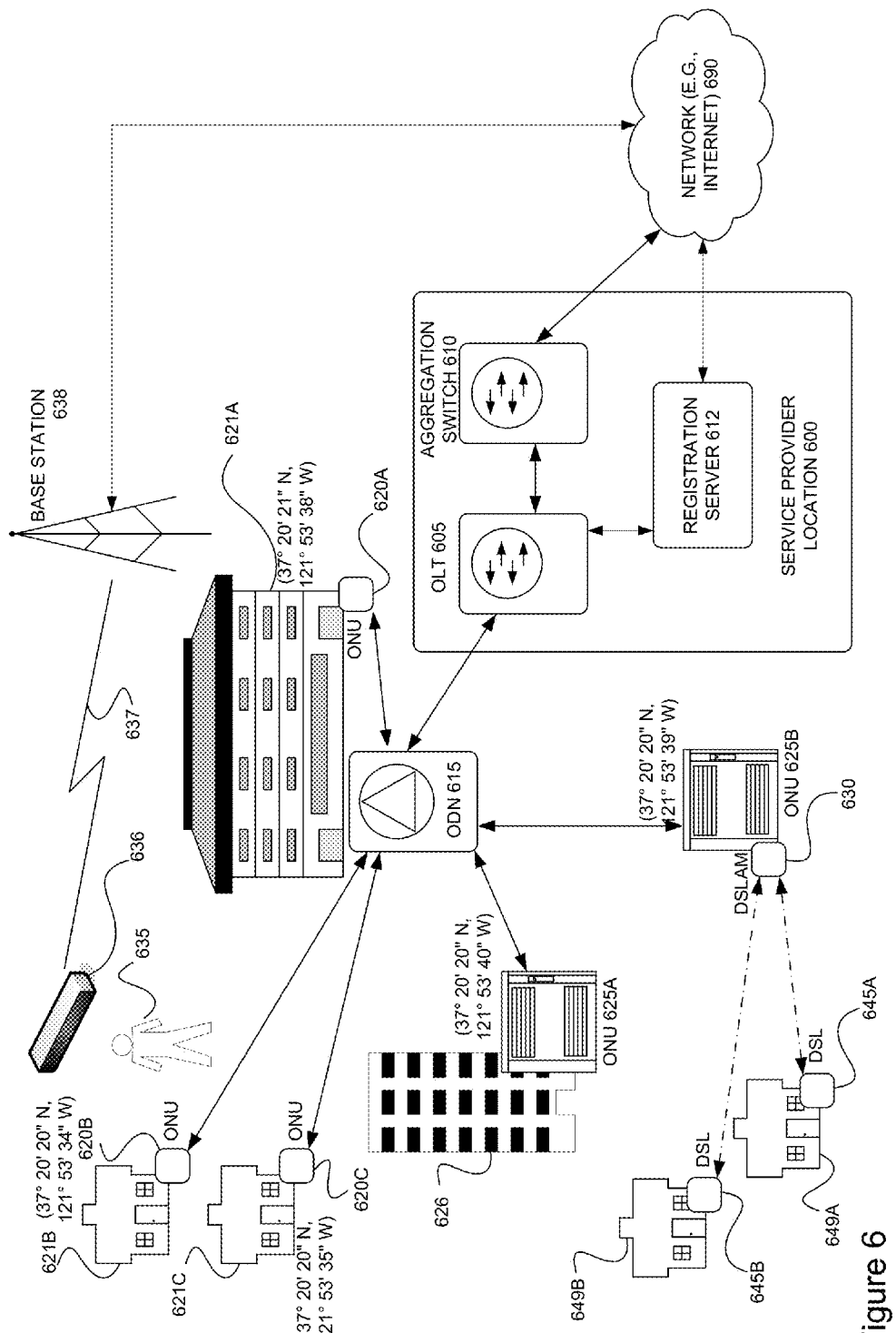
FIG. 6 is a block diagram illustrating a PON including a registration server, an OLT, and a plurality of ONUs according to embodiments of the invention.

FIG. 6 is a block diagram illustrating a PON including a registration server, an OLT, and a plurality of ONUs according to embodiments of the invention. In FIG. 6, a service provider location 600 comprises an OLT 605 coupled with an aggregation switch 610 and a registration server 612. The aggregation switch couples a PON served by the OLT 605 with another network 690 which is also coupled to the registration server 612. In one embodiment, the other network 690 is the internet, while in other embodiments the other network 690 comprises: a telecommunications operator backbone transport network, another wide area network, or a metro ethernet network. The OLT 605 is coupled to an optical distribution network (ODN) 615. The ODN 615 comprises a series of optical fibers and splitters between the OLT 605 and the plurality of ONUs 620A-C and 625A-B in the PON. The OLT 605 is coupled to the ODN 615 with one or more optical fibers with, in the upstream direction, each optical fiber ultimately carrying optical power from one or more ONUs. The OLT 605 detects light on an optical fiber through an optical transceiver that is further capable of transmitting light down the fiber toward the ONUs. FIG. 6 shows a plurality of ONUs 620A-C, and 625A-B coupled to the ODN 615. Each of the one or more ONUs, also referred to as optical network terminals (ONTs), converts optical signals into electrical signals for delivery to the subscriber via another medium such as copper or wireless. Each subscriber location in FIG. 6 is illustrated with a corresponding set of geographic coordinates used in embodiments of the invention to determine the actual geographic location of subscriber devices, i.e. subscriber ONUs. A typical ONU allows a fiber-optic connection to provide multiple services to a subscriber, such as plain old telephone service (POTS), internet data, and video.

In FIG. 6, the PON comprises fiber-optic connections to two homes 621B and 621C. Each of the corresponding ONUs 620B-C serves subscribers at the homes. These connections are referred to as Fiber-To-The-Home (FTTH). FTTH is optimized for single-family homes.

The PON further comprises Fiber-To-The-Premises (FTTP) and Fiber-To-The-Building (FTTB) connections. FTTP connections and FTTB connections refer to fiber-optic delivery that terminates prior to reaching the subscribers' living area or work area. For example, 621A is a multi-family dwelling unit such as an apartment complex with an FTTP connection terminated at ONU 620A. The apartment complex then provides service to one or more subscribers through any networking technology such as conventional twisted pair, coaxial cable, wireless, power-line communication, or even an on-site optical network. Similarly, an office building such as 626 has an FTTB connection that terminates at ONU 625A. ONU 625A then converts the fiber-optic communication into other network technologies for distribution to subscribers within the office building 626.

The PON further comprises a Fiber-To-The-Curb (FTTC) connection terminated at the ONU 625B. With FTTC connections, the ODN terminates near the location of several customers and some other form of broadband is used to couple each customer with the ONU. In one embodiment, digital subscriber line (DSL) broadband is used to couple subscribers to the ONU. In FIG. 6, ONU 625B is coupled to a DSL access multiplexer (DSLAM) 630. The DSLAM 630 provides a data connection with DSL modems 645A-B, which allow subscribers in homes 649A-B to access data services provided by ONU 625B. Other embodiments may use other broadband technologies to couple ONU 625B with subscribers (e.g., category 5 or 6 twisted pair, coaxial cable, wireless, power-line communication, or even a secondary optical network). ONUs 625A-B are shown as larger than ONU's 620A-C to indicate that some ONUs may be designed to serve more subscribers as is typical with ONUs providing FTTB and FTTC connections as compared with ONUs providing FTTP and FTTH connections.

In FIG. 6, an installer 635 has been sent to the location of ONU 620B to replace a broken ONU. Once the new ONU is installed, the installer 635 utilizes the mobile terminal 636 to register the new ONU in the PON. The mobile terminal 636 communicates with the registration server 612 through a radio communications link 637 with a base station 638. The base station is coupled through the network 690 with the registration server 612. In embodiments utilizing geographic location, the mobile terminal 636 uses the geographic coordinates as determined during installation to transmit the actual geographic location of the newly installed ONU 620B to the registration server 612.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A system for registering an optical network unit (ONU) installed in a passive optical network (PON), the system comprising:
 a mobile terminal coupled to a registration server via a communication system separate from the PON, the mobile terminal configured to:
  collect an ONU identification from the ONU,
  collect a subscriber identification,
  transmit the ONU identification and the subscriber identification to the registration server via the communication system,
  determine an actual geographic location corresponding with the geographic location where the ONU resides, and
  transmit the actual geographic location to the registration server via the communication system;
 the registration server configured to:
  receive the ONU identification and subscriber identification from the mobile terminal via the communication system, retrieve subscriber information from a subscriber database based on the subscriber identification, associate the ONU with the subscriber information, transmit, to an optical line terminal (OLT), an association between the ONU and the subscriber information to enable the OLT to provision telecommunications service for the ONU, receive the actual geographic location, retrieve an expected geographic location based on the subscriber information, wherein the expected geographic location corresponds to a predetermined geographic location designated for the ONU, compare the actual geographic location with the expected geographic location, and raise an exception in response to the actual geographic location being a mismatch with the expected geographic location, wherein the exception indicates the ONU is not at the expected geographic location; and the OLT configured to serve as an endpoint for the ONU in the PON.

2. The system of claim 1, wherein the OLT is further configured to provision telecommunications service to the ONU based on the association between the ONU and the subscriber information.

3. The system of claim 1, wherein the subscriber identification is based on the actual geographic location.

4. The system of claim 1, wherein:

the mobile terminal is further configured to transmit a work order complete message to the registration server; and the registration server is further configured to:

retrieve a work order record based on the subscriber identification, and close the work order record in response to receiving the work order complete message from the mobile terminal.

5. The system of claim 1, wherein the mobile terminal comprises a user interface configured to receive user input to collect at least one of the ONU identification or the subscriber identification.

6. The system of claim 1, wherein the mobile terminal comprises an electronic reader configured to collect at least one of the ONU identification or the subscriber identification.

7. The system of claim 6, wherein the electronic reader is a bar code scanner configured to collect at least one of the ONU identification or the subscriber identification, wherein the ONU identification is collected from an ONU identification barcode and the subscriber identification is collected from a barcode on a paper work order record.

8. The system of claim 6, wherein the electronic reader is a radio frequency identification (RFID) reader configured to read an ONU identification RFID signal.

9. The system of claim 1, wherein:

the registration server is further configured to transmit the exception to the mobile terminal; and the mobile terminal is further configured to:

receive the exception, and present the exception to an operator using the mobile terminal.

10. A method performed by a registration server for registering an optical network unit (ONU) in a passive optical network (PON), the method comprising:

receiving an ONU identification from a mobile terminal via a communication network separate from the PON, the ONU identification having been collected at the mobile terminal;

receiving a subscriber identification from the mobile terminal via the communication network, the subscriber identification having been collected at the mobile terminal;

retrieving subscriber information based on the subscriber identification from a subscriber database;

receiving an actual geographic location corresponding with the geographic location where the ONU resides;

retrieving an expected geographic location based on the subscriber information, wherein the expected geographic location corresponds to a predetermined geographic location designated for the ONU;

comparing the expected geographic location with the actual geographic location; and raising an exception in response to the actual geographic location being a mismatch to the expected geographic location, wherein the exception indicates the ONU is not at the expected geographic location;

associating the ONU with the subscriber information; and transmitting an association between the ONU and the subscriber information to an optical line terminal (OLT) serving as an endpoint for the ONU in the PON.

11. The method of claim 10, further comprising:

retrieving a work order record based on the subscriber identification;

receiving a work order complete message from the mobile terminal; and closing the work order record in response to receiving the work order complete message.

12. The method of claim 10, further comprising transmitting the exception to the mobile terminal.

13. The method of claim 10, wherein the subscriber identification comprises the actual geographic location corresponding with the geographic location where the ONU resides.

14. A method performed by a mobile terminal for registering an optical network unit (ONU) in a passive optical network (PON), the method comprising:

collecting an ONU identification of the ONU;

collecting a subscriber identification of a subscriber;

transmitting the ONU identification and subscriber identification, over a communications system separate from the PON, to a registration server to associate the ONU with the subscriber corresponding to the subscriber identification;

determining an actual geographic location corresponding with the geographic location where the ONU resides;

transmitting the actual geographic location to the registration server;

receiving an exception from the registration server indicating the actual geographic location does not match an expected geographic location for the ONU; and presenting the exception to an operator to indicate the mismatch between the actual geographic location and the expected geographic location.

15. The method of claim 14, wherein collecting the ONU identification comprises:

prompting the operator for the ONU identification; and receiving the ONU identification through manual entry from the operator.

16. The method of claim 14, wherein the subscriber identification comprises the actual geographic location corresponding with the geographic location where the ONU resides.

17. The method of claim 14, further comprising transmitting a work order complete message to the registration server in response to the operator indicating that a work order is complete.

18. The method of claim 14, wherein the subscriber identification comprises information collected from a work order record.

19. The method of claim 18, wherein the work order record is a paper record of a work order and the subscriber identification is collected from the paper record with a barcode scanner.

20. The method of claim 14, wherein collecting the ONU identification comprises:
    reading the ONU identification from the ONU through an electronic reader.

21. The method of claim 20, wherein the electronic reader is a barcode scanner.

22. The method of claim 20, wherein the electronic reader is a radio frequency identification reader.

\* \* \* \* \*

UNITED STATES PATENT AND TRADEMARK OFFICE
CERTIFICATE OF CORRECTION

| | | |
|---|---|---|
| PATENT NO. | : 8,873,969 B2 | Page 1 of 1 |
| APPLICATION NO. | : 13/151063 | |
| DATED | : October 28, 2014 | |
| INVENTOR(S) | : Hood et al. | |

It is certified that error appears in the above-identified patent and that said Letters Patent is hereby corrected as shown below:

In the Specification

In Column 1, Line 48, delete "terminal" and insert -- terminal. --, therefor.

In Column 11, Line 63, delete "terminal" and insert -- terminal. --, therefor.

Signed and Sealed this
Thirtieth Day of June, 2015

Michelle K. Lee
*Director of the United States Patent and Trademark Office*